Jan. 10, 1967 N. H. SACHNIK 3,297,298
THROTTLING VALVES AND EROSION-RESISTANT SEATS THEREFOR
Filed Aug. 26, 1964

*INVENTOR.*
NORMAN H. SACHNIK
BY

ATTORNEY

United States Patent Office 3,297,298
Patented Jan. 10, 1967

3,297,298
THROTTLING VALVES AND EROSION-
RESISTANT SEATS THEREFOR
Norman H. Sachnik, Houston, Tex., assignor to
Texsteam Corporation
Filed Aug. 26, 1964, Ser. No. 392,130
3 Claims. (Cl. 251—316)

This application is a continuation-in-part of my copending application Serial No. 326,557, filed November 27, 1963.

This invention, in general, relates to valves structurally adapted to throttle the flow of fluids and to erosion-resistant throttle seats therefor. The valve structures and seat structures are especially adapted for use in throttling applications wherein the throttled fluid contains abrasive particles.

Throttle valves on gas control assemblies for gas wells are one type wherein abrasive wear, owing to high gas pressures and abrasive particles carried by the gas, e.g., sand, is particularly acute. The downstream, throttling seat for the rotatable, flow control plug of the valve is subject to heavy abrasive wear in such valves.

This invention pertains to improvements in valve structures having erosion-resistant throttling seats at the downstream side of a rotatable, flow control plug. The throttle seat has an upstream, curved face forming a saddle portion in which is matingly seated the curved face of the flow control plug. The seat embodies a two-piece, rigid core comprising a pair of matingly fitted, hollow, inner and outer core sections. The outer core section is preferably a thermosetting resin body, e.g., phenol-formaldehyde, and has an annular, elastomer, seal member set in the peripheral portion thereof. The inner core section is preferably a metal body and has a flaring, axial passage with a ring insert of erosion-resistant material such as tungsten carbide at the upstream throat thereof.

It is, therefore, a primary object of the invention to provide improvements in valves useful in throttling flow of abrasively erosive gases.

Another object of the invention resides in the provision of throttling valves with improved seats for rotatable throttling members or plugs.

Still another object is to provide throttling valve structures embodying a throttling seat for the rotatable valve plug and composed of hollow, interfitted inner and outer core sections.

Another object is to provide throttling seats having an axial fluid passage having at its upstream throat a ring of erosion-resistant material.

Other objects, features, and advantages of the invention will be apparent from the following detailed disclosure, taken in conjunction with the accompanying drawings, wherein like reference numerals refer to like parts and in which.

Figure 1:
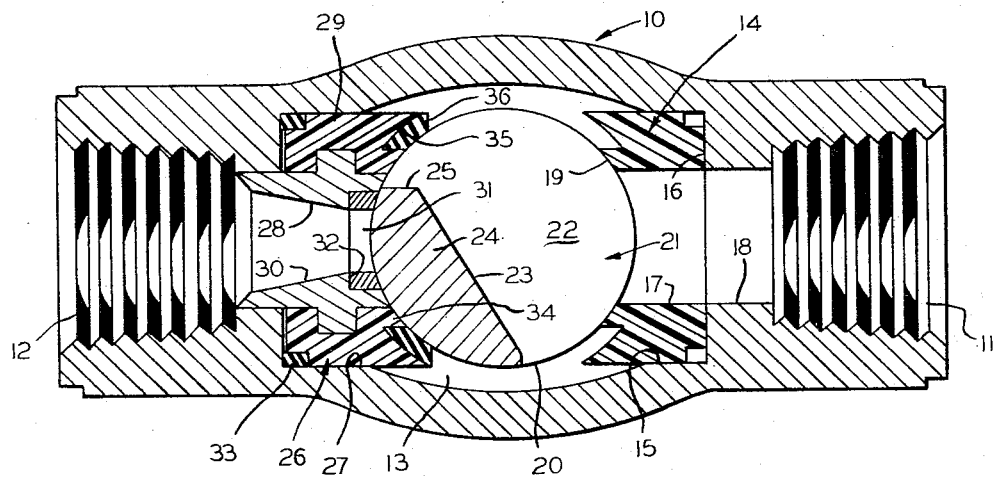
FIG. 1 is a longitudinal, vertical section taken through a preferred embodiment of a throttling valve of the present invention.
Figure 2:
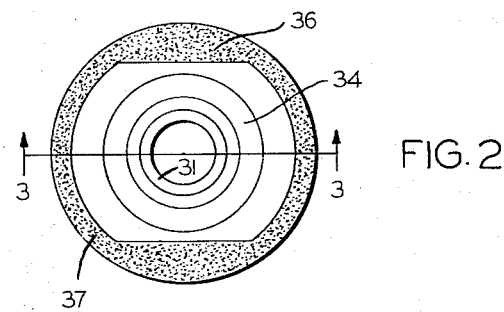
FIG. 2 is a top plan view of the downstream seat shown in FIG. 1.
Figure 3:
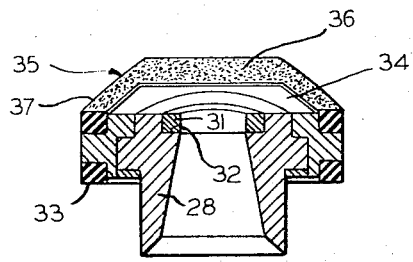
FIG. 3 is a sectional view taken on section plane 3—3 of FIG. 2.

Referring now to the drawings, the valve of the present invention includes a body 10 having a tapped inlet port 11, a tapped outlet port 12 coaxially aligned with the inlet port, and a flow control chamber or valve chamber 13 positioned intermediate the inlet and outlet ports. The body 10, preferably, is made of ductile iron, although any other suitable material may be employed.

A ring-shaped guide seat 14 is mounted within the chamber 13 in a cylindrical bore 15 which is coaxial with ports 11 and 12. The guide seat 14 seats against the ring-shaped shoulder 16 at the downstream or outlet end of the inlet port 11. The guide seat 14 has a cylindrical, axial passage 17 coaxial with and of the same diameter as a cylindrical wall 18 at the outlet or downstream end of the inlet port.

The downstream end of seat 14 has a circularly curved seat or saddle 19 matingly receiving the cylindrical wall 20 of the rotatable valve plug 21. The valve plug 21 has a cylindrical valve body portion with its rotational axis extending perpendicular to the axes of the seats and ports. The plug preferably is constructed of an erosion and corrosion-resistant metal or other material.

The plug 21 is formed to enable a throttling orifice to be defined ahead of the throttling seat 26 and outlet orifice 12 while permitting free flow through the guide seat 14 and inlet port 11. A transaxially cut out portion extends more than 180° around the periphery of the plug 21 and includes parallel side walls 22 spaced apart a distance approximately equal to the diameter of the passage 17 and coaligned with opposite diametric points on both passage 17 and passage 30 of the throttle seat 26. A transversely arcuate, sloping wall or face 23 on a neck or bridge portion defining a flow control member 24 interconnects the innermost edges of the side walls 22. The edge surface 25 is somewhat flatted to provide a vertically arcuate wall to coact with the throttling seat 26 and define a restrictive orifice. By somewhat flatting the surface 25, turbulence beyond the orifice is minimized. The dimension of the flow control member 24 is such that, when the plug is rotated to fully open the valve, a substantially unobstructed passageway is defined between the inlet and outlet ports. The flow control member 24 may be oriented to cover fully the passage 30 of seat 26 to provide a shut-off function. Further details of the valve plug 21 and its mounting in valve body 10 may be found in my aforesaid copending application.

The seat 26 is mounted in a cylindrical bore 27 at the downstream end of the chamber 13, which bore is coaxial with ports 11 and 12 and bore 15. The seat 26 comprises a pair of interfitted, hollow, inner and outer core sections 28 and 29, respectively. The inner core section 28 is a metal member and has an axial, fluid passage 30 which flares in the downstream direction. The flared passage 30 serves to protect that portion of the valve and conduit from the erosive effect of the high velocity jet by decreasing the jet velocity within a replaceable part. The flare avoids a sharp change in velocity into the conduit bore which would result in another area of eddies and turbulence. The upstream throat of passage 30 has a ring 31 set in a recess 32 at said throat. The ring 31 is made of an erosion-resistant material such as a carbide, e.g., tungsten carbide. The ring 31 bears the brunt of erosive action by fluids carrying abrasive particles such as sand. The opening in ring 31 is substantially smaller than the passage in seat 14, thereby maintaining a minimum of turbulence upstream of the throttling portion of the valve.

The inner core section 28 has an annular rib or ring around its outer wall, which ring is embedded in the outer core section 29, which is preferably molded thereabout from a hard, wear-resistant, heat-resistant synthetic resin, preferably a thermosetting resin such as phenol-formaldehyde resin. The outer core section seats reasonably tightly in bore 27, and the space therebetween is sealed against fluid loss by the seal ring 33.

The throttle seat 26 has a circularly curved, upstream seat or saddle 34 in which is matingly seated the cylindrical plug 21. The outer edges of the outer core section 29 have a peripheral recess in which is seated fixedly a ring-like seal member 35.

The upstream face of seal member 35 has side lips 36 and end lips 37 which project slightly above arcuate continuations of the curvature of the rigid, central portion of saddle 34 formed by the upstream faces of inner core section 28, outer core section 29, and ring 31. The lips 36 are longitudinally straight, transversely curved lips while the lips 37 are longitudinally curved, transversely straight lips. These lips are compressed or resiliently distorted when the cylindrical wall of plug 21 bears tightly against the saddle 34. This provides a seal at said lips against fluid loss between the contacting parts of plug 21 and lips 36 and/or 37 to improve throttling control by restricting fluid flow to only the passage in the plug 21 and the passage 30.

The invention heretofore described pertaining to embodiments of throttle valves with cylindrical valve plugs and mating seats therefor can be employed with equal advantages in throttle valves with spherical valve plugs and mating seats therefor. Other types of passages through the plugs may be used, also, though to lesser advantage.

It will be understood that modifications and variations may be effected without departing from the scope of the novel concepts of the present invention, but it is understood that this application is to be limited only by the scope of the appended claims.

The invention is hereby claimed as follows:

1. A throttle valve comprising, a valve body having a flow control plug rotatably mounted therein intermediate inlet and outlet ports in said valve body, a throttle seat mounted in said valve body adjacent said outlet port, said seat having a hollow, inner, metal core having an axial, fluid passage therethrough and an outer, hollow core in surrounding relationship to said metal core, said outer core being a thermosetting resin, the upstream faces of said inner and outer cores being curved to define an arcuate saddle portion of said seat matingly seated against said flow control plug, and a ring of erosion-resistant material seated in an annular recess in said inner core at the upstream end of said passage, the upstream face of said ring being arcuately flush with said saddle portion and defining the upstream end of said passage.

2. A throttle valve comprising, a valve body having a flow control plug rotatably mounted therein intermediate inlet and outlet ports in said valve body, a throttle seat mounted in said valve body adjacent said outlet port, said seat having a hollow, inner, metal core having an axial, fluid passage therethrough and an outer, hollow core in surrounding relationship to said metal core, said outer core being a thermosetting resin, the upstream faces of said inner and outer cores being curved to define an arcuate saddle portion of said seat matingly seated against said flow control plug, a peripheral, elastomer ring on said saddle portion and having elastomer lips pressed against said plug, and a ring of erosion-resistant material seated in an annular recess in said inner core at the upstream end of said passage, the upstream face of said ring being arcuately flush with said saddle portion and defining the upstream end of said passage.

3. A throttle seat for a rotatable, flow control plug of a throttle valve comprising, a hollow, inner, metal core having an axial, fluid passage therethrough and an outer, hollow core in surrounding relationship to said metal core, said outer core being a thermosetting resin, the upstream faces of said inner and outer cores being curved to define an arcuate saddle portion of said seat adapted to seat matingly against said flow control plug, and a ring of erosion-resistant material seated in an annular recess in said inner core at the uptsream end of said passage, the upstream face of said ring being arcuately flush with said saddle portion and defining the upstream end of said passage.

References Cited by the Examiner

UNITED STATES PATENTS

| 2,716,421 | 8/1955 | Bertrand | 251—368 X |
| 2,728,551 | 12/1955 | Blackman | 251—317 |

M. CARY NELSON, *Primary Examiner.*

E. K. FEIN, *Assistant Examiner.*